(12) United States Patent
Abe et al.

(10) Patent No.: US 10,219,054 B2
(45) Date of Patent: Feb. 26, 2019

(54) PROTECTIVE MEMBER FOR ACOUSTIC COMPONENT AND WATERPROOF CASE

(71) Applicant: NITTO DENKO CORPORATION, Ibaraki-shi, Osaka (JP)

(72) Inventors: Yuichi Abe, Osaka (JP); Akihisa Murata, Osaka (JP)

(73) Assignee: NITTO DENKO CORPORATION, Osaka (JP)

( * ) Notice: Subject to any disclaimer, the term of this patent is extended or adjusted under 35 U.S.C. 154(b) by 0 days.

(21) Appl. No.: 14/404,298

(22) PCT Filed: May 24, 2013

(86) PCT No.: PCT/JP2013/003313
§ 371 (c)(1),
(2) Date: Nov. 26, 2014

(87) PCT Pub. No.: WO2013/179631
PCT Pub. Date: Dec. 5, 2013

(65) Prior Publication Data
US 2015/0146905 A1 May 28, 2015

(30) Foreign Application Priority Data
May 31, 2012 (JP) .................................. 2012-124284

(51) Int. Cl.
*H04R 1/02* (2006.01)
*C08K 3/04* (2006.01)
*H04R 1/08* (2006.01)

(52) U.S. Cl.
CPC ................ *H04R 1/02* (2013.01); *H04R 1/086* (2013.01); *C08K 3/04* (2013.01); *H04R 1/023* (2013.01);
(Continued)

(58) Field of Classification Search
CPC ......... H04R 1/283; H04R 1/2834; H04R 1/44
See application file for complete search history.

(56) References Cited

U.S. PATENT DOCUMENTS 6,512,834 B1   1/2003  Banter et al.
2003/0223799 A1* 12/2003 Pihlaja .................. G06F 3/0202
                                                     400/490
(Continued)

FOREIGN PATENT DOCUMENTS

CN      201210743      3/2009
CN      201611942      10/2010
(Continued)

OTHER PUBLICATIONS

English machine translation of JP2008-182474 (Matsumoto et al., Electronic Equipment and Imaging Apparatus, published Aug. 2008).*
(Continued)

*Primary Examiner* — Mark Fischer
(74) *Attorney, Agent, or Firm* — Greenblum & Bernstein, P.L.C.

(57) ABSTRACT

A protective member for an acoustic component includes a sound-transmissive sheet composed of an elastomer. The protective member for an acoustic component may further include an adhesive layer disposed on an edge region of the sound-transmissive sheet. The sound-transmissive sheet in the protective member may have waterproofness, and may be used with a waterproof case.

16 Claims, 8 Drawing Sheets

(52) U.S. Cl.
CPC ... *H04R 2499/11* (2013.01); *Y10T 428/24777* (2015.01)

(56) References Cited

U.S. PATENT DOCUMENTS

| | | | | |
|---|---|---|---|---|
| 2005/0139460 A1* | 6/2005 | Hosaka | ............... | H01H 13/704 |
| | | | | 200/314 |
| 2006/0177085 A1 | 8/2006 | Izuchi et al. | | |
| 2006/0258325 A1 | 11/2006 | Tsutaichi et al. | | |
| 2007/0046874 A1 | 3/2007 | Adachi et al. | | |
| 2008/0165996 A1 | 7/2008 | Saito et al. | | |
| 2009/0268928 A1* | 10/2009 | Ikeyama | ............... | C09J 7/0282 |
| | | | | 381/150 |
| 2010/0247857 A1* | 9/2010 | Sanami | ............... | H04M 1/18 |
| | | | | 428/138 |
| 2010/0330484 A1* | 12/2010 | Seitoku | ............... | C09B 67/0033 |
| | | | | 430/107.1 |
| 2011/0100234 A1* | 5/2011 | Chang | ............... | G06F 1/1637 |
| | | | | 100/35 |
| 2011/0188247 A1 | 8/2011 | Huang et al. | | |
| 2012/0188690 A1* | 7/2012 | Aihara | ............... | G03B 17/08 |
| | | | | 361/679.01 |
| 2013/0012117 A1* | 1/2013 | Uemura | ............... | F21S 48/332 |
| | | | | 454/275 |
| 2013/0043766 A1* | 2/2013 | Takahashi | ............... | H04R 17/00 |
| | | | | 310/326 |
| 2013/0223656 A1* | 8/2013 | Iuchi | ............... | H04R 1/023 |
| | | | | 381/189 |
| 2014/0072163 A1* | 3/2014 | Yamada | ............... | H04R 1/00 |
| | | | | 381/354 |

FOREIGN PATENT DOCUMENTS

| | | | | |
|---|---|---|---|---|
| CN | 201887942 | 6/2011 | | |
| EP | 1394905 | 3/2004 | | |
| GB | 2087688 A * | 5/1982 | ............... | H04R 7/02 |
| JP | H01088535 | 6/1989 | | |
| JP | 2003-503991 | 1/2003 | | |
| JP | 2004-83811 | 3/2004 | | |
| JP | 2006-222641 | 8/2006 | | |
| JP | 2006237690 | 9/2006 | | |
| JP | 2006262262 | 9/2006 | | |
| JP | 2006333076 | 12/2006 | | |
| JP | 2008105411 | 5/2008 | | |
| JP | 2008-182474 | 8/2008 | | |
| JP | 4456656 B | 4/2010 | | |
| JP | WO 2011074579 A1 * | 6/2011 | ............... | H04R 7/20 |
| JP | 2011-142680 | 7/2011 | | |
| JP | 2012025160 | 2/2012 | | |
| KR | 101059568 | 8/2011 | | |
| TW | 200520588 | 6/2005 | | |
| WO | WO 01/03468 | 1/2001 | | |
| WO | 2005/053356 | 6/2005 | | |

OTHER PUBLICATIONS

Extended European Search Report issued in corresponding European Patent Application No. 13796471.4, dated Feb. 19, 2016, 7 pages.

Office Action issued for European Patent Application No. 13796471.4, dated Nov. 8, 2016, 4 pages.

* cited by examiner

Water pressure

PROTECTIVE MEMBER FOR ACOUSTIC COMPONENT AND WATERPROOF CASE

TECHNICAL FIELD

The present invention relates to a protective member for an acoustic component and to a waterproof case.

BACKGROUND ART

Among electronic devices including a component (acoustic component), such as a sound emitter like a speaker or a buzzer and a sound receiver like a microphone, which is involved in acoustic function, there are many devices, as exemplified by mobile phones and digital cameras, which are carried and used outdoors. In recent years, it has been required to impart waterproof function to such electronic devices including an acoustic component while ensuring their sound transmitting properties. Waterproof mobile phones and waterproof digital cameras etc. have already become widespread, and, in order to protect acoustic parts (acoustic components) of such devices, filters having waterproof function and sound transmitting function have been used.

For example, an outer housing of a waterproof camera including a microphone and a speaker is provided with openings located at positions corresponding to those of the microphone and the speaker. The openings are covered with filters having waterproof function and sound transmitting function, so that both sound transmitting properties and waterproofness are ensured.

It has been proposed to use a microporous membrane like a stretched polytetrafluoroethylene (PTFE) film as a protective member for protecting an acoustic component (see Patent Literature 1, for example).

CITATION LIST

Patent Literature

Patent Literature 1: JP 2003-503991 T

SUMMARY OF INVENTION

Technical Problem

However, microporous membranes like the PTFE film proposed as a protective member in Patent Literature 1 have a problem in that they are easily deformed under external stress. Such a protective member is irreversibly deformed once it is exposed to high pressure. Such deformation causes change in the vibration mode of the protective member, thus reducing the sound transmissivity. Particularly, waterproof cameras may be used under water to take images, and the use of a waterproof camera with the protective member in a submerged condition rated as IPX 8 in terms of the degree of protection against water (JIS C 0920) results in a large amount of irreversible deformation of the protective member and a significant reduction in sound transmissivity. Also, a membrane composed of a PTFE membrane and a net or non-woven fabric adhered together, or a polyethylene terephthalate (PET) film, is often used as a membrane that undergoes less amount of deformation. However, after being exposed to high water pressure, even these membranes remain irreversibly deformed, and are therefore significantly reduced in their sound transmissivity.

In view of the above circumstances, the present invention aims to provide a protective member for an acoustic component, the protective member capable of stably maintaining high performance without significant reduction in sound transmissivity even after being used in a harsh environment such as a submerged condition where the protective member is exposed to high pressure.

Solution to Problem

The present invention provides a protective member for an acoustic component, the protective member including a sound-transmissive sheet composed of an elastomer.

In addition, the present invention provides a waterproof case including:
- a protective member for an acoustic component, the protective member including a sound-transmissive sheet composed of an elastomer and
- a case including a frame having a sound transmitting opening and an operation opening, and an elastic transparent film attached to the frame so as to cover the operation opening.

The protective member is attached to the case so as to cover the sound transmitting opening.

Advantageous Effects of Invention

In the protective member of the present invention for an acoustic component, the sound-transmissive sheet is composed of an elastomer. Therefore, the protective member of the present invention for an acoustic component is less likely to be irreversibly deformed even when used in a harsh environment where the protective member is exposed to high pressure. Accordingly, the protective member of the present invention for an acoustic component can stably maintain high performance without significant reduction in sound transmissivity even after being exposed to high pressure, for example, in a submerged condition.

With the waterproof case of the present invention, an electronic device such as a mobile phone can be used in an environment requiring protection against water by enclosing the electronic device within the waterproof case. In addition, the electronic device can be operated via the elastic transparent film attached to the frame so as to cover the operation opening.

DESCRIPTION OF EMBODIMENTS

Hereinafter, embodiments of the present invention will be described with reference to the drawings. The following description is not intended to limit the present invention.

Figure 1A:
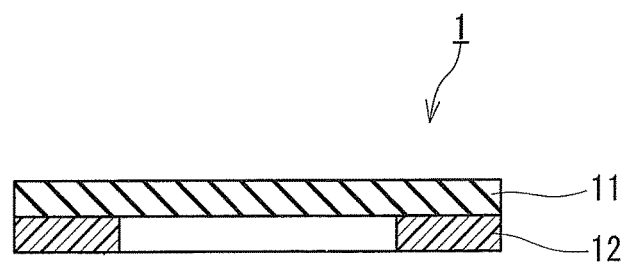
FIG. 1A is a cross-sectional view showing an embodiment of a protective member of the present invention for an acoustic component.
Figure 1B:
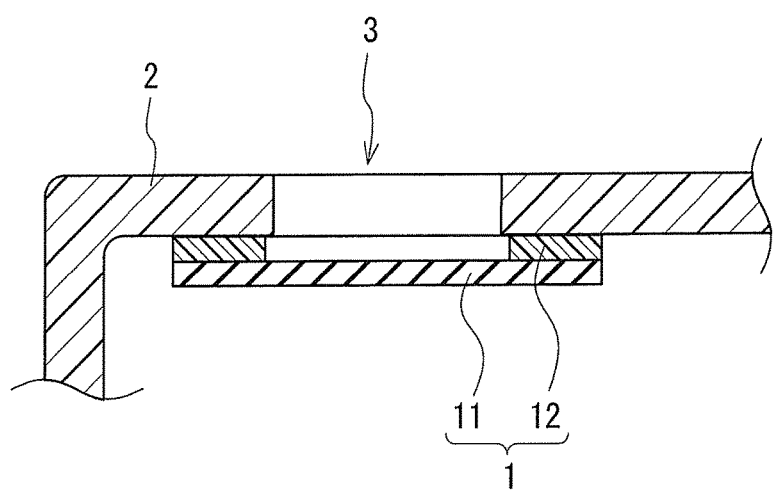
FIG. 1B is a cross-sectional view showing an example of a situation where the protective member shown in FIG. 1A is installed on an outer housing of a device.

FIG. 1A shows a cross-sectional view of a protective member 1 of the present embodiment for an acoustic component. FIG. 1B shows an example of installation of the protective member 1 of the present embodiment for an acoustic component.

As shown in FIG. 1, the protective member 1 of the present embodiment for an acoustic component includes a sound-transmissive sheet 11 and an adhesive layer 12 disposed on an edge region of the sound-transmissive sheet 11.

The sound-transmissive sheet 11 is composed of an elastomer. The elastomer used in the sound-transmissive sheet 11 may be a rubber-like elastic body ((rubber-based) thermosetting elastomer) or may be a thermoplastic elastomer. The elastomer is preferably a rubber-like elastic body having rubber hardness. The rubber-like elastic body is not particularly limited as long as it is a material having rubber-like elasticity. In order to achieve more excellent sound transmissivity, however, it is desirable to use a rubber-like elastic body whose type A hardness as measured according to JIS K 6253 is in the range of 20 to 80. Examples of the rubber-like elastic body in the present embodiment include silicone rubber, ethylene-propylene-diene rubber (EPDM), acrylic rubber, and natural rubber. Among these, silicone rubber having excellent properties such as excellent heat resistance and chemical resistance is desirably used.

The sound-transmissive sheet 11 may be subjected to a coloring treatment. If the sound-transmissive sheet 11 is transparent or white, the sound-transmissive sheet 11 may be too conspicuous when the sound-transmissive sheet 11 is disposed so as to cover an opening of a housing of a device. By coloring the sound-transmissive sheet 11 according to the color of the housing to which the sheet 11 is disposed, it is possible to obtain the sound-transmissive sheet 11 that is not too conspicuous when disposed on the housing. In this case, for example, the sound-transmissive sheet 11 is colored black. When the appearance quality of the housing is given importance, disposing the sound-transmissive sheet 11 so as to cover the opening of the housing could deteriorate the appearance quality. By coloring the sound-transmissive sheet 11 according to the appearance quality of the housing, it is possible to obtain the protective member 1 for an acoustic component that has favorable appearance quality.

The coloring of the sound-transmissive sheet 11 can be achieved, for example, by having the elastomer composing the sound-transmissive sheet 11 contain a colorant. When it is attempted to obtain the protective member 1 for an acoustic component that has favorable appearance quality, the colorant used desirably has absorptive capacity, for example, for light in at least part of the wavelength range from 380 nm to 500 nm. In other words, the sound-transmissive sheet 11 is desirably colored black, gray, brown, green, yellow, or pink by the colorant. Examples of the method for coloring the sound-transmissive sheet 11 include: a method in which coloring is performed by mixing a colorant such as a pigment or carbon black with an elastomer yet to be formed into a sheet, that is, with an elastomer raw material; and a method in which an elastomer having been formed into a sheet (sheet-shaped elastomer) is colored by a colorant using a dyeing technique or a printing technique. If carbon black is used as the colorant, the strength of the elastomer can be enhanced, and the effect of improving the waterproofness described later is also obtained.

The sound-transmissive sheet 11 has a thickness of, for example, 10 to 150 μm. With the thickness falling within such a range, the sound-transmissive sheet 11 can have sufficient sound transmissivity. The thickness of the sound-transmissive sheet 11 can be adjusted to a desired thickness by any of the following methods: a method in which a solution as a raw material is extruded in the form of a thin layer onto a releasable substrate by a discharge means such as a die; a method in which a solution as a raw material is cast onto a releasable substrate and is then formed into a thin film by an applicator, a wire bar, or a knife coater; and a cutting method. It has been known that, in conventional protective members as described in Patent Literature 1 in which a stretched PTFE membrane is used as a sound-transmissive sheet, the weight of the membrane per unit area (surface density) has a great influence on the sound transmissivity. Therefore, in the case of conventional protective members, the surface density is lowered by reducing the thickness of the sound-transmissive sheet as much as possible so as to improve the sound transmissivity. The present inventors have found that, in the sound-transmissive sheet 11 of the present embodiment which is composed of an elastomer, the surface density and the sound transmissivity are less correlated to each other than in the conventional sound-transmissive sheets. Therefore, the sound-transmissive sheet 11 of the present embodiment has a higher degree of design freedom than the conventional sound-transmissive sheets; thus, it is possible to select the thickness such that both high strength and high sound transmissivity can be achieved.

It is desirable that the sound-transmissive sheet 11 have a waterproofness as measured according to JIS L 1092 B method (high water pressure method) of 1 to 50 m. With such waterproofness being provided, the protective member 1 can be used under higher water pressure and can therefore have higher reliability.

The material of the adhesive layer 12 can be selected as appropriate so that the protective member 1 can be directly adhered and fixed to an acoustic component to which the protective member 1 is applied or so that the protective member 1 can be adhered and fixed to an outer housing protecting the acoustic component. As the adhesive layer 12, for example, a general-purpose double-faced tape having a substrate, a double-faced tape having no substrate (i.e., a tape consisting of only an adhesive agent), or the like, can be used as appropriate in consideration of adhesiveness to the sound-transmissive sheet 11 and adhesiveness to a housing or a case. In particular, if a silicone rubber sheet is used as the sound-transmissive sheet 11, it is preferable that the adhesive layer 12 have a surface composed of a silicone adhesive agent and that the surface composed of the silicone adhesive agent be a surface that contacts the sound-transmissive sheet 11. This is because silicone adhesive agents have much higher bonding strength to silicone rubber sheets than other adhesive agents such as acrylic adhesive agents.

The method for installing the protective member 1 is not particularly limited as long as an acoustic component can be protected. For example, the protective member 1 may be directly adhered and fixed by the adhesive layer 12 to an acoustic component to which the protective member 1 is applied. Alternatively, the protective member 1 may be adhered and fixed by the adhesive layer 12 to an outer housing protecting an acoustic component to which the protective member 1 is applied. In this case, for example, as shown in FIG. 1B, the protective member 1 is fixed to an outer housing 2 by the adhesive layer 12 in such a manner that the sound-transmissive sheet 11 covers an opening portion 3 provided in the outer housing 2. The opening portion 3 provided in the outer housing 2 is provided at a position corresponding to that of the acoustic component for the purpose of allowing sound transmission.

In the protective member 1, the sound-transmissive sheet 11 is composed of an elastomer. Therefore, even when the protective member 1 is used in a harsh environment where the protective member 1 is exposed to high pressure, irreversible deformation of the sound-transmissive sheet 11 is less likely to occur. Accordingly, the protective member 11 can stably maintain high performance without significant reduction in sound transmissivity even after being used in a harsh environment such as a submerged condition where the protective member is exposed to high pressure.

The method for producing the protective member 1 is not particularly limited, and a conventional method for producing a protective member can be used. For example, the protective member 1 can be produced by the following method. First, a sheet-shaped elastomer for forming the sound-transmissive sheet 11 and an adhesive sheet (e.g., a double-faced tape) for forming the adhesive layer 12 are prepared. In the adhesive sheet is preliminarily formed a hole that is to serve as a portion through which sound is transmitted when the protective member 1 is installed. This adhesive sheet and the sheet-shaped elastomer are adhered together, and the resulting product is formed into a predetermined shape by punching; thus, the protective member 1 can be obtained.

In the present embodiment, a configuration in which the adhesive layer 12 is provided in the protective member 1 has been described; however, the adhesive layer 12 need not be provided. In such a case, the sound-transmissive sheet 11 can be installed at a predetermined position by confining and fixing the sheet 11 with an O-ring or the like or by fixing the sheet 11 by resin sealing.

In addition, the protective member 1 may further be provided with a net, a non-woven fabric or the like for protection against dust.

The protective member 1 can also be applied to a waterproof case for enclosing an electronic device including an acoustic component. Hereinafter, an embodiment of a waterproof case of the present invention will be described.

Figure 2A:
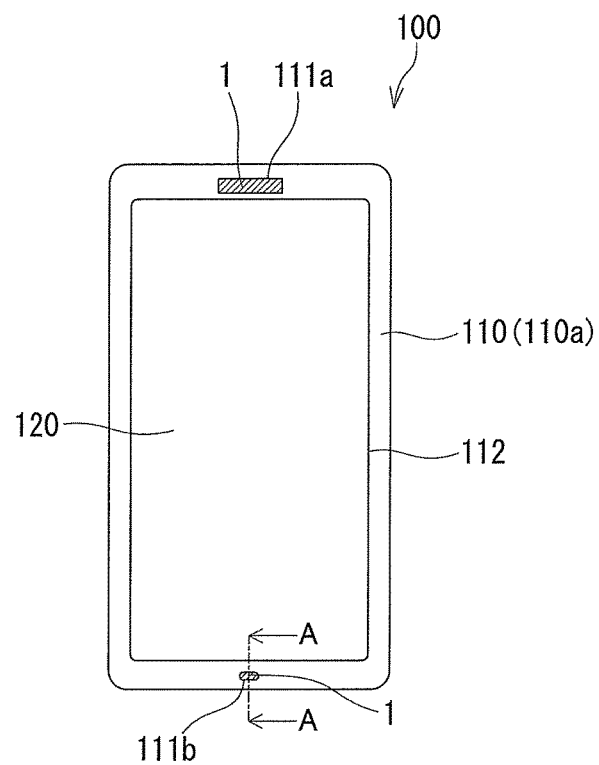
FIG. 2A is a front view showing an embodiment of a waterproof case of the present invention.
Figure 2B:
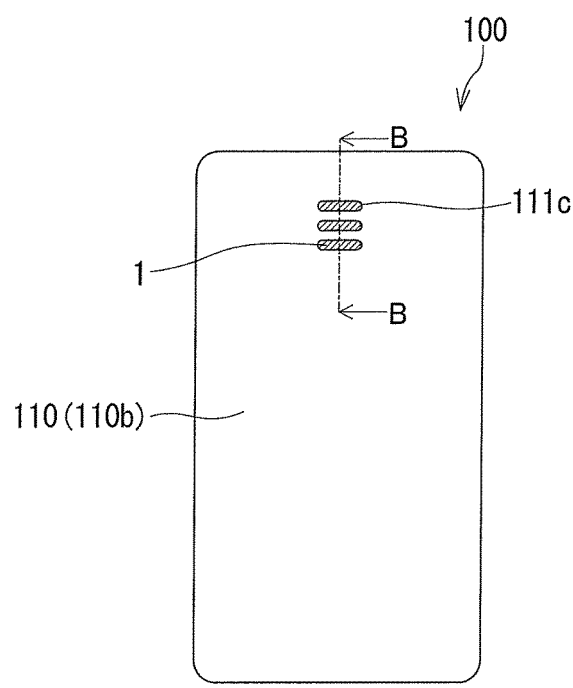
FIG. 2B is a back view of the waterproof case shown in FIG. 2A.
Figure 3A:
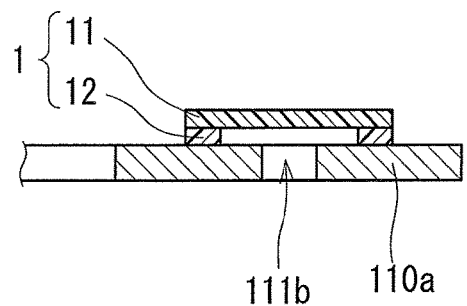
FIG. 3A is a cross-sectional view taken along the A-A line of FIG. 2A.
Figure 3B:
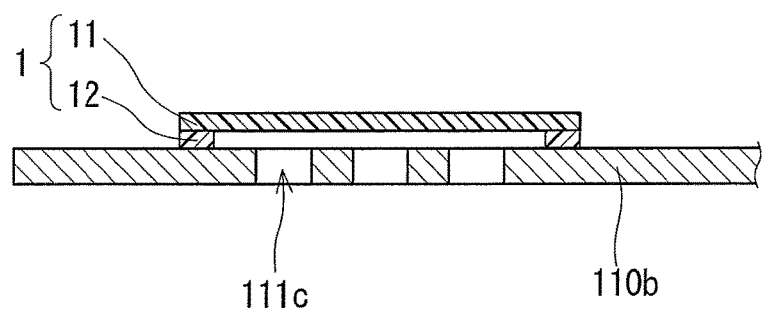
FIG. 3B is a cross-sectional view taken along the B-B line of FIG. 2B.

As shown in FIG. 2A and FIG. 2B, the waterproof case includes the protective member 1 described above and a case 100. The case 100 includes a frame 110 and an elastic transparent film 120. The frame 110 has an upper frame 110a and a lower frame 110b. The upper frame 110a has a structure of a thin plate that has a rectangular contour and at the center of which a rectangular opening is formed. The upper frame 110a has a sound transmitting opening 111a, a sound transmitting opening 111b, and an operation opening 112. The lower frame 110b is in the shape of a bottomed box having an open top, and has a sound transmitting opening 111c in the bottom surface. The elastic transparent film 120 is attached to the upper frame 110a so as to cover the operation opening 112. The elastic transparent film 120 is, for example, a silicone rubber film or a urethane elastomer film. In addition, as shown in FIG. 3A, the protective member 1 is joined to the upper frame 110a via the adhesive layer 12 so as to cover the sound transmitting opening 111b. Similarly, the protective member 1 is joined to the upper frame 110a via the adhesive layer 12 so as to cover the sound transmitting opening 111a. As shown in FIG. 3B, the protective member 1 is joined to the lower frame 110b via the adhesive layer 12 so as to cover the sound transmitting opening 111c.

Figure 4A:
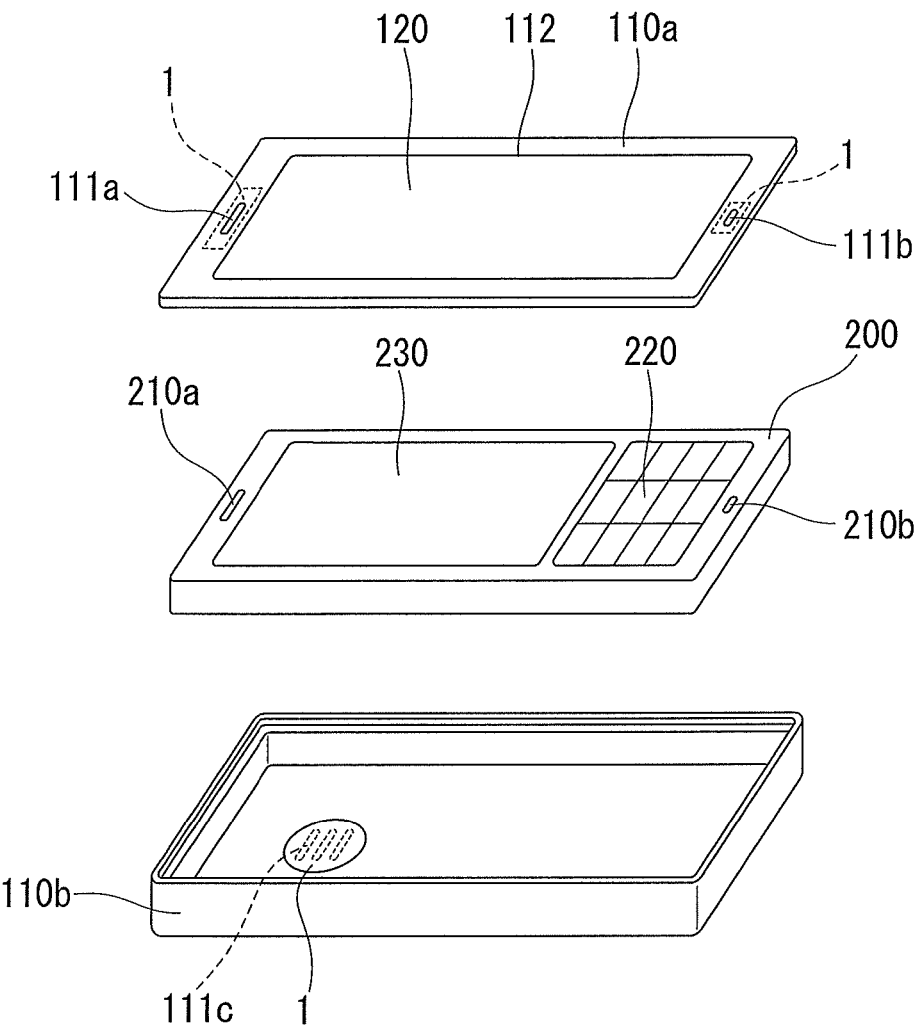
FIG. 4A is a top perspective view showing arrangement of a waterproof case and an electronic device.
Figure 4B:
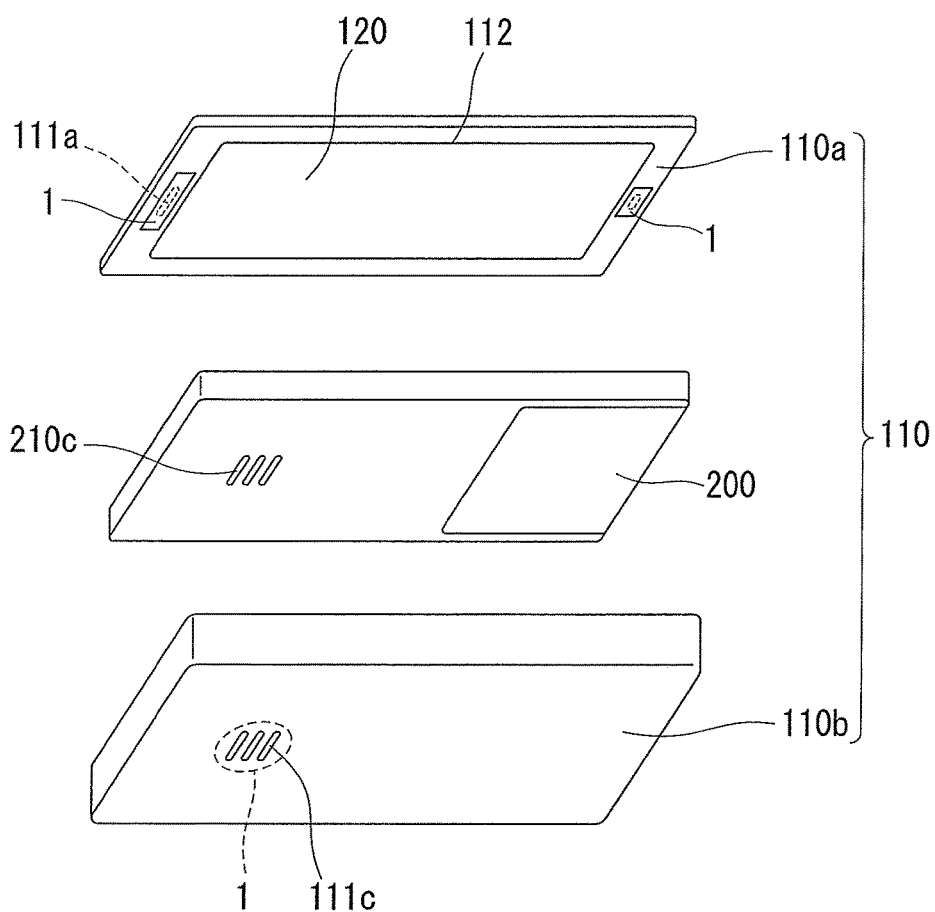
FIG. 4B is a bottom perspective view showing arrangement of a waterproof case and an electronic device.

The upper frame 110a and the lower frame 110b are assembled together in such a manner that the open top of the lower frame 110b is covered by the upper frame 110a; thus, the interior of the case 100 is protected against water. Therefore, if, as shown in FIG. 4A or FIG. 4B, an electronic device 200 such as a mobile phone is disposed between the upper frame 110a and the lower frame 110b and is enclosed within the case 100, the electronic device 200 can be used in an environment requiring protection against water.

In the state where the electronic device 200 is enclosed within the case 100, the sound transmitting opening 111a is located in a region corresponding to the location of a sound transmitting port 210a for a speaker of the electronic device 200. In addition, in the state where the electronic device 200 is enclosed within the case 100, the sound transmitting opening 111b is located in a region corresponding to the location of a sound transmitting port 210b for a microphone of the electronic device 200. Furthermore, in the state where the electronic device 200 is enclosed within the case 100, the sound transmitting opening 111c is located in a region corresponding to the location of a sound transmitting port 210c for the speaker of the electronic device 200. Therefore, in the state where the electronic device 200 is enclosed within the case 100, sound is transmitted between the outside of the case 100 and the speaker or the microphone of the electronic device 200. Thus, a user can use the speaker or the microphone of the electronic device 200 in the state where the electronic device 200 is enclosed within the case 100.

In the state where the electronic device 200 is enclosed within the case 100, the elastic transparent film 120 is in contact with the electronic device 200 in such a manner as to cover operation keys 220 and a display 230 of the electronic device 200. The user can operate the operation keys 220 via the elastic transparent film 120, and can view the display 230 through the elastic film 120. If the display 230 is a touch panel display, the user can operate the display 230 via the elastic transparent film 120. Therefore, the user can operate the electronic device 200 in the state where the electronic device 200 is enclosed within the case 100.

EXAMPLES

Next, the protective member of the present invention for an acoustic component will be specifically described using examples.

Example 1

A two-component heat-cured silicone resin manufactured by Dow Corning Toray Co., Ltd. was diluted into toluene, and a carbon black-containing colorant manufactured by Dainichiseika Color & Chemicals Mfg. Co., Ltd. was added to and mixed with the diluted silicone resin so that the amount of carbon black was 0.2 parts by weight with respect to 100 parts by weight of the silicone resin. Thereafter, the mixture was cast onto a silicone-releasing PET separator manufactured by Mitsubishi Plastics, Inc. (product name: MRS 50), was formed into a thin film by an applicator, and was then dried by heating to obtain a 33-μm-thick silicone rubber sheet. This silicone rubber sheet was used as a sound-transmissive sheet. The thickness and hardness of the silicone rubber sheet used were as shown in Table 1. The methods for measuring the thickness and hardness will be described later. A double-faced tap (No. 5303W manufactured by Nitto Denko Corporation) was used as an adhesive layer. The silicone rubber sheet, and the double-faced tape in which a hole having a diameter φ of 6 mm was preliminarily formed, were combined together and subjected to punching; thus, a protective member having an outer diameter φ of 12 mm was formed. The double-faced tape was disposed on the edge region of the circular silicone rubber sheet having a diameter φ of 12 mm, and had the shape of a ring having an outer diameter φ of 12 mm and an inner diameter φ of 6 mm.

The thus-fabricated protective member was adhered to a polycarbonate (PC) plate having a diameter φ of 47 mm and provided with a hole having a diameter φ of 2 mm; thus, a sample for an acoustic test and a waterproof test was prepared. This PC plate was used for the purpose of performing the later-described acoustic test and waterproof test for the protective member using the same sample. The hole having a diameter φ of 2 mm in the PC plate was provided as an imitation of a sound hole provided in a housing of a mobile phone or a digital camera. The results of the acoustic test and the waterproof test were as shown in Table 1. The methods for the acoustic test and the waterproof test will be described later.

Example 2

A 10-μm-thick silicone rubber sheet was obtained by the same method as in Example 1, except that the thickness of the thin film formed by an applicator was greater than that in Example 1. Using this silicone rubber sheet as a sound-transmissive sheet, a protective member was fabricated by the same method as in Example 1. In addition, a sample for the acoustic test and the waterproof test was also fabricated in the same manner as in Example 1.

Example 3

A protective member was fabricated by the same method as in Example 1, except that a sheet-shaped EPDM rubber (EB 80 NNS manufactured by KUREHA ELASTOMER Co., Ltd.) was used as the sound-transmissive sheet. In addition, a sample for the acoustic test and the waterproof test was also fabricated in the same manner as in Example 1.

Comparative Example 1

A protective member was fabricated by the same method as in Example 1, except that a stretched porous PTFE membrane (NTF 1026 manufactured by Nitto Denko Corporation) was used as the sound-transmissive sheet. In addition, a sample for the acoustic test and the waterproof test was also fabricated in the same manner as in Example 1.

Comparative Example 2

A sheet (NTF 1026-N06 manufactured by Nitto Denko Corporation) composed of the stretched porous PTFE membrane used in Comparative Example 1 and a PET net as a reinforcing member thermally-bonded to the PTFE membrane was used as the sound-transmissive sheet. Except for this, the same method as in Example 1 was employed to fabricate a protective member. In addition, a sample for the acoustic test and the waterproof test was also fabricated in the same manner as in Example 1.

<Method for Measuring Thickness of Sound-Transmissive Sheet>

The thicknesses of the sheets were measured using a 1/1000 mm dial gauge (φ=10 mm).

<Method for Measuring Hardness of Sound-Transmissive Sheet>

The hardnesses of the elastomers used in the sound-transmissive sheets were measured by a type A durometer as specified in JIS K 6253.

<Acoustic Test>

Figure 5A:
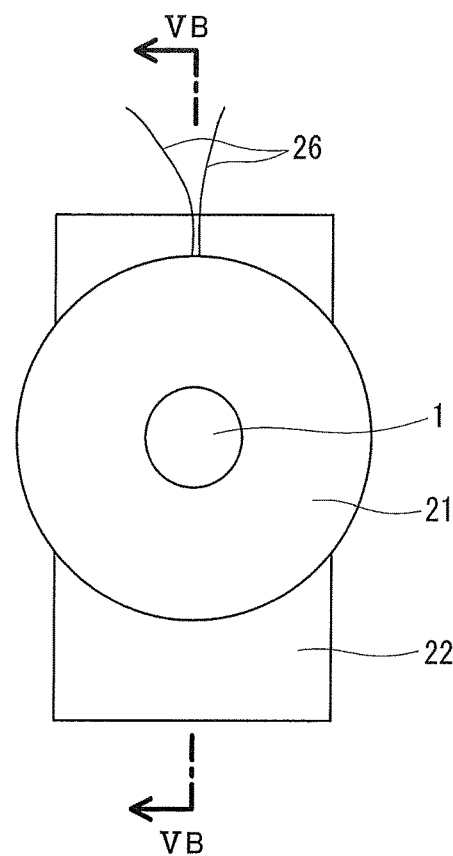
FIG. 5A is a plan view showing a situation where a protective member is installed on a testing apparatus in an acoustic test.
Figure 5B:
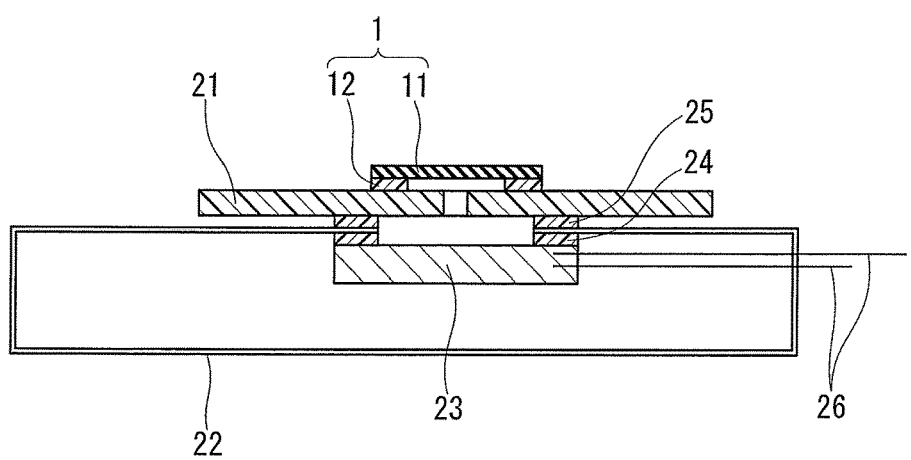
FIG. 5B is a cross-sectional view taken along the VB-VB line of FIG. 5A.

FIGS. 5A and 5B illustrate a method of installation of the protective member 1 in the acoustic test. FIG. 5A is a plan view, and FIG. 5B is a cross-sectional view taken along the VB-VB line of FIG. 5A. First, an acrylic case 22 having a length of 70 mm, a width of 50 mm, and a height of 15 mm was prepared, and a hole having a diameter φ of 13 mm was provided in the case 22. A speaker 23 was adhered to the inner wall of the case 22 at a position corresponding to that of the hole by using a ring-shaped double-faced tape 24 having an outer diameter φ of 16 mm and an inner diameter φ of 13 mm. This case 22 was used to prevent input sound from wavering. Furthermore, the sample (composed of the protective member 1 and the PC plate 21 adhered together) fabricated for the acoustic test was adhered to the outer wall of the case 22 with a double-faced tape 25 so as to cover the hole of the case 22. In the figures, the numeral 26 denotes lead wires of the speaker 23. Values of sound pressure were measured using a sound transmitting property evaluation apparatus for the situation where the protective member 1 was installed in the above fashion and for the situation where the protective member 1 was not installed. The difference between the measured values was calculated to evaluate a change in sound pressure (dB). The load voltage of the speaker 23 and the distance between the microphone (not shown) and the speaker 23 were adjusted so that the sound pressure of input sound was about 90 dB without the protective member 1 being installed. The acoustic test was performed both before and after the waterproof test. The apparatus etc. used in the acoustic test were as follows.

Sound transmitting property evaluation apparatus: 3560-B-030 manufactured by Bruel & Kjar Microphone: Type 2669 manufactured by Bruel & Kjar Detail of Evaluation: Evaluation of sound pressure at 1 kHz by FFT (Fast Fourier Transformation)

Speaker: SCC-16A manufactured by STAR MICRONICS CO., LTD., φ=16 mm

Distance between microphone and speaker: 50 mm

Load voltage of speaker: 1.0 V

<Waterproof Test>

Figure 6:
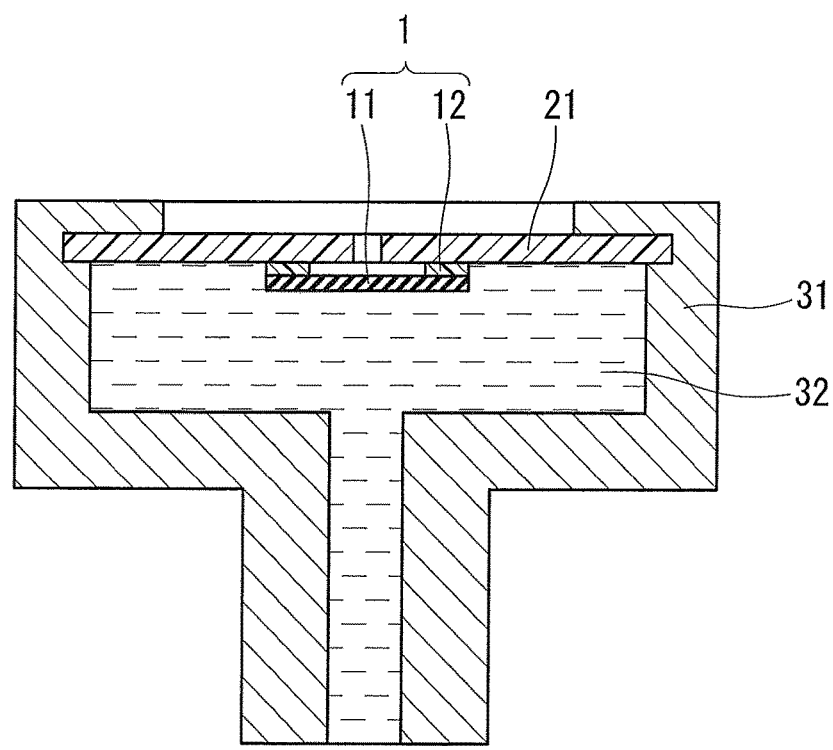
FIG. 6 is a cross-sectional view showing a situation where a protective member is installed on a testing apparatus in a waterproof test.
Figure 7A:
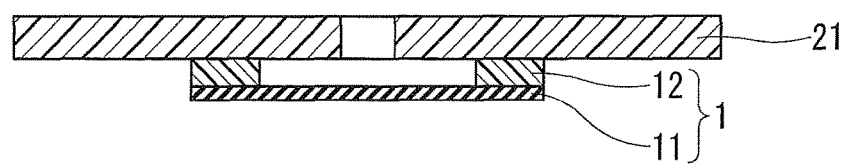
FIG. 7A is a cross-sectional view showing the state of the sound-transmissive sheet before the waterproof test.
Figure 7B:
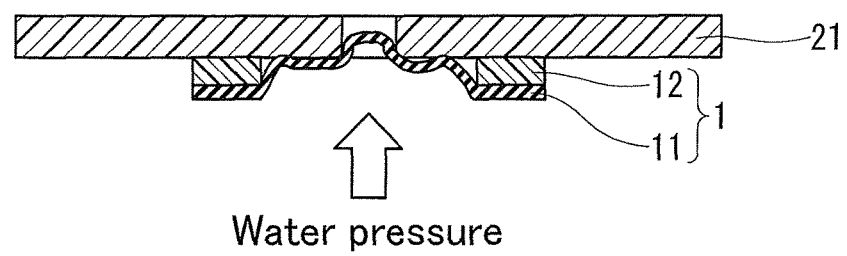
FIG. 7B is a cross-sectional view showing the state of the sound-transmissive sheet deformed by water pressure during the waterproof test.

As shown in FIG. 6, the sample (composed of the protective member 1 and the PC plate 21 adhered together) fabricated for the waterproof test was installed on a waterproof testing case 31. The sample was installed on the waterproof testing case 31 in such an orientation that the protective member 1 was located inwardly of the PC plate 21 within the case 31. The interior of the waterproof testing case 31 was filled with water 32. The protective member 1 thus installed was subjected to a water pressure of 50 kPa equivalent to the pressure at a water depth of 5 m, by way of simulation of a water immersion test corresponding to IPX 8 indicated as one of the degrees of protection against water (IPX) which are specified in JIS C 0920. According to the test method specified as JIS L 1092 B method (high water pressure method), the water pressure was increased up to 50 kPa and was maintained for 30 minutes. At this time, the sound-transmissive sheet 11 was subjected to the water pressure and deformed as shown in FIG. 7B, unlike the sound-transmissive sheet 11 that had not been subjected to the waterproof test yet and that was free from water pressure (FIG. 7A). After that, whether the deformation of the sound-transmissive sheet 11 of the protective member 1 remained was visually inspected.

TABLE 1

|  | Material of sound-transmissive sheet and its hardness | Thickness (mm) | Surface density (g/m²) | Sound pressure difference before waterproof test (dB) | Sound pressure difference after waterproof test (dB) | Deformation after waterproof test (Visual inspection) |
|---|---|---|---|---|---|---|
| Example 1 | Silicone rubber (hardness 65) | 0.033 | 45 | −9 | −13 | Restored to original state |
| Example 2 | Silicone rubber (hardness 65) | 0.101 | 122 | −15 | −18 | Restored to original state |
| Example 3 | EPDM rubber (hardness 80) | 0.105 | 124 | −21 | −23 | Restored to original state |
| Comparative Example 1 | Porous PTFE membrane | 0.025 | 10 | −6 | −30 | Deformation remained |
| Comparative Example 2 | Porous PTFE membrane + PET net | 0.100 | 35 | −19 | −33 | Deformation remained |

In Examples 1 to 3 in which a sound-transmissive sheet composed of an elastomer was used, after the water pressure applied during the waterproof test was removed, the sound-transmissive sheet was restored from a deformed state during the water pressure application (see FIG. 7B) to the original shape (see FIG. 7A). In addition, the change in sound pressure difference before and after the waterproof test was very small. By contrast, in the sound-transmissive sheets of Comparative Examples 1 and 2, the deformation remained even after the waterproof test, and the sound pressure was significantly reduced after the waterproof test.

The sound pressure difference before the waterproof test was compared between Example 1 and Example 2 in both of which a sound-transmissive sheet composed of silicone rubber was used. Despite the fact that the surface density of the sound-transmissive sheet of Example 2 was increased by 2.7 fold compared with that of the sound-transmissive sheet of Example 1, the sound pressure difference was not so increased, and significant reduction in sound transmissivity was not observed.

INDUSTRIAL APPLICABILITY

The protective member of the present invention for an acoustic component can stably maintain high performance without significant reduction in sound transmissivity even after being used in a harsh environment where the protective member is exposed to high pressure. Therefore, the protective member of the present invention for an acoustic component is useful not only for waterproof mobile phones and waterproof digital cameras but also as a protective member for an acoustic component mounted in a device such as an underwater camera which is used in a submerged condition.

The invention claimed is:

1. A protective member for an acoustic component, the protective member comprising a sound-transmissive sheet that consists essentially of an elastomer, wherein no lamination of another layer is formed on any major surface of the sound-transmissive sheet, or a lamination of another layer is formed only on an edge region of any major surface of the sound-transmissive sheet; and wherein the elastomer has a type A hardness in a range from 20 to 80 as measured according to JIS K 6253, and the sound-transmissive sheet has a thickness of 10 to 150 μm.

2. The protective member for an acoustic component according to claim 1, wherein the sound-transmissive sheet has a waterproofness in a range from 1 to 50 m as measured according to JIS L 1092 B high water pressure method.

3. The protective member for an acoustic component according to claim 1, wherein a lamination of another layer is formed only on an edge region of any major surface of the sound-transmissive sheet, and further comprising an adhesive layer disposed on the edge region of at least one of the major surface of the sound-transmissive sheet.

4. The protective member for an acoustic component according to claim 3, wherein the adhesive layer comprises a heat-resistant double-faced tape.

5. The protective member for an acoustic component according to claim 3, wherein the adhesive layer has a surface comprising a silicone adhesive agent.

6. The protective member for an acoustic component according to claim 1, wherein the elastomer comprises a colorant, and the colorant has an absorptive capacity for light in at least part of a wavelength range from 380 nm to 500 nm.

7. The protective member for an acoustic component according to claim 1, wherein the elastomer comprises a colorant, and the sound-transmissive sheet is colored black, gray, brown, green, yellow, or pink with the colorant.

8. The protective member for an acoustic component according to claim 1, wherein the protective member has no irreversible deformation after the protective member is under a water pressure increased to 50 kPa and maintained at 50 kPa for 30 minutes according to JIS L 1092 B method.

9. The protective member for an acoustic component according to claim 1, wherein the elastomer is a thermosetting elastomer.

10. The protective member for an acoustic component according to claim 1, wherein the sound-transmissive sheet consists of an elastomer.

11. A waterproof case comprising:
a protective member recited in claim 1; and a case comprising: a frame having a sound transmitting opening and an operation opening; and an elastic transparent film attached to the frame so as to cover the operation opening, wherein the protective member is attached to the case so as to cover the sound transmitting opening.

12. A waterproof case comprising:

a protective member for an acoustic component, the protective member comprising a sound-transmissive sheet that consists essentially of an elastomer; and a case comprising: a frame having a sound transmitting opening and an operation opening; and an elastic transparent film attached to the frame so as to cover the operation opening, wherein the protective member is attached to the case so as to cover the sound transmitting opening, and no lamination of another layer is formed on any major surface of the sound-transmissive sheet, or a lamination of another layer is formed only on an edge region of any major surface of the sound-transmissive sheet layer, the elastomer has a type A hardness in a range from 20 to 80 as measured according to JIS K 6253, and the sound-transmissive sheet has a thickness of 10 to 150 μm.

13. A protective member for an acoustic component, the protective member comprising a sound-transmissive sheet having a thickness of 10 to 150 μm, the sound-transmissive sheet comprising elastomer, the elastomer in the sound-transmissive sheet has a type A hardness in a range from 20 to 80 as measured according to JIS K 6253 and is configured to have a waterproofness and sound-transmissiveness that are maintained without significant reduction in sound transmissivity when subjected to a test method wherein water pressure is increased to 50 kPa and maintained for 30 minutes according to JIS L 1092 B method.

14. The protective member for an acoustic component according to claim 13, further comprising an adhesive layer disposed only on an outer edge region of the sound-transmissive sheet.

15. The protective member for an acoustic component according to claim 14, wherein the adhesive layer has a surface comprising a silicone adhesive agent.

16. The protective member for an acoustic component according to claim 13, wherein the elastomer comprises a colorant.

* * * * *